United States Patent
Wang et al.

(10) Patent No.: US 8,612,139 B2
(45) Date of Patent: Dec. 17, 2013

(54) SYSTEMS AND METHODS FOR PLANNING VEHICLE ROUTES BASED ON SAFETY FACTORS

(75) Inventors: Jenne-Tai Wang, Rochester, MI (US); Bing Deng, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 425 days.

(21) Appl. No.: 12/956,182

(22) Filed: Nov. 30, 2010

(65) Prior Publication Data

US 2012/0136567 A1 May 31, 2012

(51) Int. Cl.
G01C 21/00 (2006.01)

(52) U.S. Cl.
USPC ............. 701/410; 701/400; 701/411

(58) Field of Classification Search
USPC .......................... 701/400, 410–411
See application file for complete search history.

(56) References Cited

U.S. PATENT DOCUMENTS

| | | | |
|---|---|---|---|
| 6,175,803 B1 * | 1/2001 | Chowanic et al. ............ | 701/533 |
| 6,415,226 B1 * | 7/2002 | Kozak ........................... | 701/411 |
| 6,571,174 B2 | 5/2003 | Rigazio et al. | |
| 6,615,133 B2 | 9/2003 | Boies et al. | |
| 6,725,155 B1 | 4/2004 | Takahashi et al. | |
| 6,873,905 B2 | 3/2005 | Endo et al. | |
| 2006/0247852 A1 * | 11/2006 | Kortge et al. ................. | 701/209 |
| 2007/0219717 A1 | 9/2007 | Chang | |
| 2008/0208469 A1 * | 8/2008 | Obradovich et al. ......... | 701/213 |
| 2009/0045927 A1 | 2/2009 | Atella | |
| 2009/0048771 A1 | 2/2009 | Speier et al. | |
| 2009/0088965 A1 | 4/2009 | Burckart et al. | |
| 2009/0157498 A1 | 6/2009 | Seltzer et al. | |
| 2010/0036599 A1 | 2/2010 | Froeberg et al. | |
| 2010/0036610 A1 * | 2/2010 | Urciuoli et al. .............. | 701/213 |

FOREIGN PATENT DOCUMENTS

| | | |
|---|---|---|
| DE | 102007039329 A1 | 2/2008 |
| DE | 102007017240 A1 | 10/2008 |
| EP | 2037219 A1 | 3/2009 |
| JP | 2003021525 A | 1/2003 |
| JP | 2008082796 A | 4/2008 |
| JP | 2009229108 A | 10/2009 |
| JP | 2010019650 A | 1/2010 |

OTHER PUBLICATIONS

Mapquest. Mapquest driving directions [retrieved on Jul. 7, 2010]. Retrieved from Internet: <URL: http://www.mapquest.com/>.
Bing. Bing driving directions [retrieved on Jul. 7, 2010]. Retrieved from Internet: <URL: http://www.bing.com/maps/default.aspx?wip=2&v=2&style#JmNwPTU2Ljl0NjExNjYyNjk3MDkyN H4tMTA2Ljk4Njl1MTU2NzgyNzU0Jmx2bD01JmRpcj0wJnN0e T1yJnJ0cD1hZHIufmFkci4mbW9kZT1EJnJ0b3A9MH4wjB+>.
Garmin. ecoRoute HD [retrieved on Nov. 30, 2010]. Retrieved from Internet: <URL: http://www.garmin.com/garmin/cms/us/extras/services/ecoRoute>.
Garmin. nüvi® 1690 [retrieved on Nov. 30, 2010]. Retrieved from Internet: <URL: https://buy.garmin.com/shop/shop.do?pID=64339 &ra=true>.
German Patent and Trademark Office. German Office Action dated Jan. 21, 2013 for Application No. 10 2011 085 893.8.

* cited by examiner

Primary Examiner — Hussein A. Elchanti
(74) Attorney, Agent, or Firm — Ingrassia Fisher & Lorenz, P.C.

(57) ABSTRACT

A method and system are provided for planning a route for a vehicle from a starting point to a destination. The method includes the steps of generating a plurality of routes based on a non-safety factor; evaluating the plurality of routes based on a safety factor; selecting a first route from the plurality of routes based on the safety factor; generating driving instructions based on the first route; displaying the first route on a display device.

18 Claims, 4 Drawing Sheets

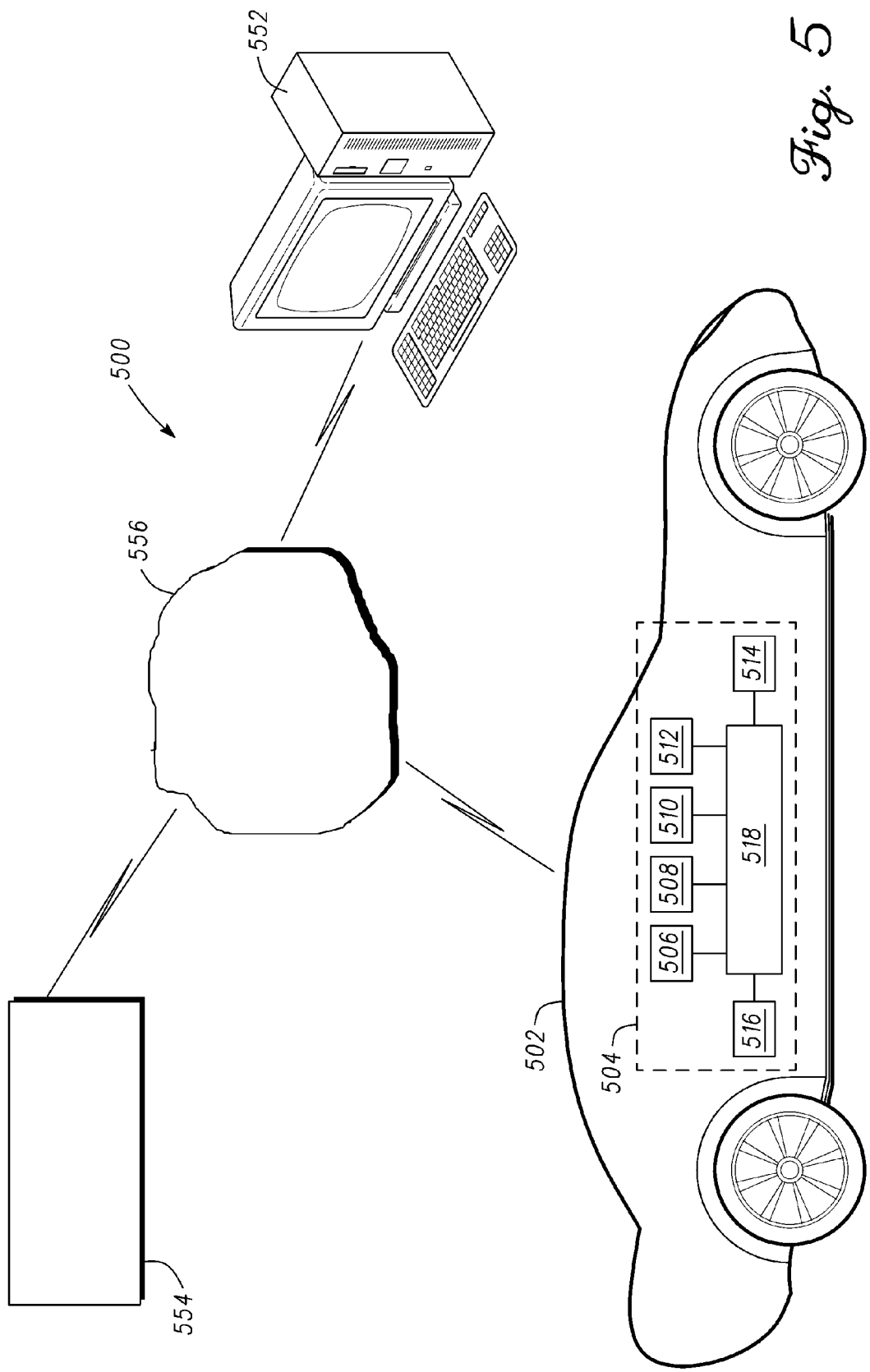

SYSTEMS AND METHODS FOR PLANNING VEHICLE ROUTES BASED ON SAFETY FACTORS

TECHNICAL FIELD

The technical field generally relates to vehicle route planning systems and methods and more particularly relates to route planning systems and methods that generate routes based on various safety factors.

BACKGROUND

Conventional computer-implemented mapping applications often include route planning functionality that can be utilized to provide users with directions between two locations. For example, the system may provide a suggested route for a user based on a beginning point of travel to an end point of travel (e.g., beginning and ending addresses). Such applications may utilize representations of roads and intersections and one or more algorithms to output a suggested route of travel. Such routes may be planned on a personal computing device or a vehicle navigation system, and users have grown to rely on these applications for vehicle navigation.

Some conventional route planning systems may attempt to optimize a route based upon different factors. For example, a route is typically generated by examining a number of possible paths, and selecting the best path according to a number of optimization rules. The optimization rules are usually related to driving distance or driving time. For example, the optimization rules may choose the shortest possible route to minimize the distance traveled or high-speed roads to minimize travel time. After the optimization criteria have been selected and a proposed route is calculated, navigation instructions are presented to the user.

Some users, such as drivers without any time constraints or restrictions on the number of miles traveled, may not find conventional route planning systems particularly useful. Other drivers may be more concerned about other factors that might otherwise influence a selected route. For example, safety-minded drivers might be more concerned about finding a relatively safe route that has a statistically low accident rate. No such route planning systems are available.

Accordingly, it is desirable to provide systems and methods for determining a recommended route that is based, at least in part, on safety considerations. Furthermore, other desirable features and characteristics will become apparent from the subsequent detailed description and the appended claims, taken in conjunction with the accompanying drawings and the foregoing technical field and background.

SUMMARY

In accordance with an exemplary embodiment, a method is provided for planning a route for a vehicle from a starting point to a destination. The method includes the steps of generating a plurality of routes based on a non-safety factor; evaluating the plurality of routes based on a safety factor; selecting a first route from the plurality of routes based on the safety factor; generating driving instructions based on the first route; and displaying the first route on a display device.

In accordance with an exemplary embodiment, a system is provided for planning a route from a starting point to a destination. The system includes a non-safety data source configured to store non-safety data; a safety data source configured to store safety data; a processor coupled to the non-safety and safety data sources and configured to generate a plurality of routes based on the non-safety data, evaluate the plurality of routes based on the safety data, select a first route from the plurality of routes based on the safety data, and generate driving instructions based on the first route; and a display device coupled to the processor and configured to receive the driving instructions and to generate a user display based on the driving instructions.

DESCRIPTION OF THE DRAWINGS

One or more examples will hereinafter be described in conjunction with the following drawing figures, wherein like numerals denote like elements, and wherein:

FIG. 5 is a simplified schematic representation of a route planning system in accordance with an alternate exemplary embodiment.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Broadly, exemplary embodiments discussed herein provide route planning systems and methods that recommend a particular route based on several safety factors. In practice, the systems and methods may generate a number of routes, assign risk scores for each section of the routes, determine the relative weights of the factors, and sum the weighted risk scores to arrive at a final risk score for each route. The relatively safest route is provided to the user as a recommended route.

Figure 1:
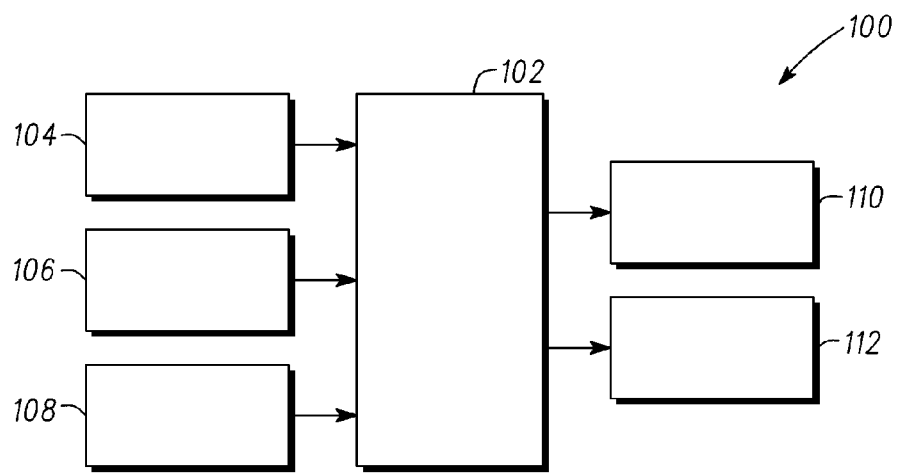
FIG. 1 is a simplified schematic representation of a route planning system in accordance with an exemplary embodiment.

FIG. 1 is a schematic representation of a route planning system 100 in accordance with an exemplary embodiment. As discussed in greater detail below, the route planning system 100 may be embodied with vehicle navigation system or a general purpose computer.

The route planning system 100 generally includes a route planning processor 102 coupled to a location data source 104, at least one safety data source 106, a user interface 108, a display device 110, and an audio device 112. In practice, the components are coupled to route planning processor 102 in a manner that facilitates the communication of data, instructions, control signals, and possibly other signals to and from the route planning processor 102. Of course, additional components configured to perform additional functions may be provided.

Generally, the route planning processor 102 is configured to perform or otherwise support the various operations and functions described herein. For example, the route planning processor 102 may include any type of computer, microprocessor or controller, as well as any additional logical or functional elements realized by hardware, software, firmware, or any combination thereof, such as additional processors, controllers, memory elements, or the like.

The location data source 104 provides the current geographical location to the route planning processor 102. In one embodiment, location data source 104 is realized as a global positioning system (GPS) component that derives the current position from real-time GPS data received from GPS satellites. In other embodiments, the location data source 104 may be omitted and a location of interest, or even the current location, may be provided by the user for use by the route planning processor 102.

The safety data source 106 generally contains statistical and/or real-time data indicative of the relative safety of route sections. The safety data source 106 may be embodied as locally stored, cached, downloaded, or remotely accessible safety data that can be processed by the route planning processor 102. For example, the safety data source 106 may be realized as one or more hard disks, semiconductor memory devices, portable storage media, or other types of memory that is accessible by the route planning processor 102. As discussed in greater detail below, the safety data may correspond to accident data, road characteristics data, crime rate data, and any other types of data related to safety risk.

In practice, a proposed route will typically include a plurality of route sections (e.g., road or highway segments, intersections, on/off ramps, city blocks, geographic regions, etc.), and the route sections are considered for purposes of generating the proposed route between the starting point and destination. Any number and combination of types of safety data, including more or less than those discussed herein, may be processed by the route planning processor 102. The safety data may be formatted for compatibility with the route planning processor 102 or converted into an appropriate format by the route planning processor 102 prior to processing.

The accident data from the safety data source 106 may include statistical accident rate data, real-time accident event data, accident severity data, airbag deployment data, and other accident related data corresponding to the particular route sections under consideration. In a practical embodiment, accident data may be obtained, accessed, or derived from various public or private sources, such as law enforcement bodies, state departments of transportation, National Highway Traffic Safety Administration ("NHTSA"), Insurance Institute for Highway Safety ("IIHS"), and American Automobile Association ("AAA").

The road characteristics data may include statistical and/or real-time data indicative of safety-related characteristics of the particular route sections under consideration. For example, road characteristics data may include road geometry data, such as the total number and types of lanes, the width of individual lanes, the number of roads at an intersection, the number or severity of curves in a road segment, the number of bridges, tunnels, or elevated sections in a road segment, and the number of on/off ramps in a road segment. Some road geometry data may be based on cartographic sources or data that analyzes road topologies. Other road characteristics data may include traffic management data such as the number of traffic lights, the number of stop signs, the number of left turns or U-turns, the user mix of the road, traffic volumes, and the speed limits in road segments. In further embodiments, road characteristics data may include road composition data, such as the age of the road segments; the composition of the road surface, e.g., asphalt, concrete, rubberized, gravel, dirt, texturing or the like; susceptibility to rain, snow, or ice; and the number of potholes, cracks, or other surface defects in a road segment.

The crime rate data may include statistical and/or real-time data related to the rate or severity of vehicular, personal or other types of crime associated with the particular geographical locations under consideration. In this regard, such crime data may include speeding tickets, carjacking incidents, hit-and-run incidents, vandalism or theft, reckless driving incidents, and driving under the influence incidents. Crime rate data may be obtained, accessed, or derived from various public or private sources, such as law enforcement bodies, insurance companies, and vehicle security companies.

The display device 110, audio device 112, and user interface 108 may be configured to enable any type of interaction between the user and the system 100. For example, the display device 110 may be a suitably configured liquid crystal display (LCD), plasma, cathode ray tube (CRT), or head-up display. Accordingly, the route planning processor 102 may provide rendering control signals to the display device 110 to render maps, proposed routes, roads, navigation direction arrows, and other graphical elements, as discussed in greater detail below.

Briefly, the audio device 112 may receive audio signals from the route planning processor 102, for example, that convey navigation instructions, user prompts, warning signals, and other audible signals. The user interface 108 is configured to allow the vehicle operator to enter data and/or control the functions and features of the system 100. The user interface 108 may be realized using any device or structure, such as a keyboard or keypad; a touch screen (which may be incorporated into display device 110); a voice recognition system; a cursor control device; a joystick or knob; or the like. For example, the user can manipulate the user interface 108 to enter a starting point and a destination for the route planning processor 102. If the starting point corresponds to the current vehicle location, then the user may not need to enter the starting point because the route planning processor 102 may receive the current position from the location data source 104.

Figure 2:
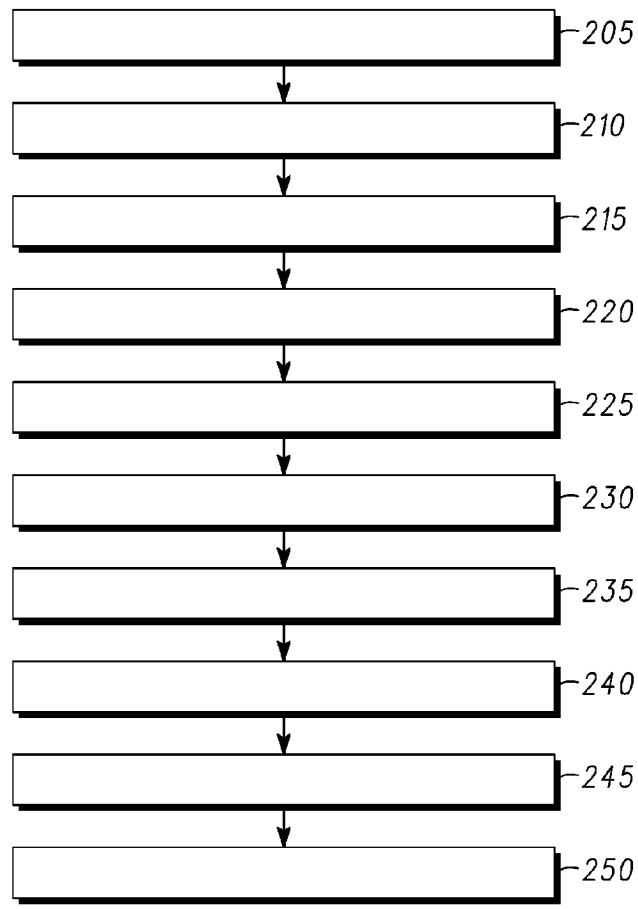
FIG. 2 is a flowchart of an exemplary method for generating recommended routes in accordance with an exemplary embodiment.

Now that the basic structure of the system 100 has been described, an exemplary description of the function will be provided as a method 200. FIG. 2 is a flowchart of the method 200. Since the method 200 may be implemented with the system 100, both FIGS. 1 and 2 are referenced below. The method 200 and system 100 will also be described with reference to FIG. 3, which is a schematic diagram illustrating potential routes 320, 330, 340 from a starting point 310 to a destination 350 generated and evaluated by the system 100 and the method 200.

In general, the method 200 provides a suggested route from the starting point to the destination based on one or more safety factors. In a first step 205 of the method 200, the route planning processor 102 receives at least the destination 350 from the user. As noted above, the user may input the destination 350 into the user interface 108. In a second step 210, the system 100 receives the starting point 310. In one exemplary embodiment, the starting point 310 is the current location provided by the location data source 104. Alternatively, the user may input the starting point 310 into the user interface 108 for consideration by the route planning processor 102.

In a third step 315, the route planning processor 102 receives a primary route planning factor selected by a user. Generally, the primary route planning factor is a factor that is not safety related, such as the shortest route in either distance or time. For example, the routes that are generated based on factors other than safety (i.e., non-safety routes) may be generated using algorithms that compute all possible routes between two points and then chooses one or more routes from the possible routes.

Figure 3:
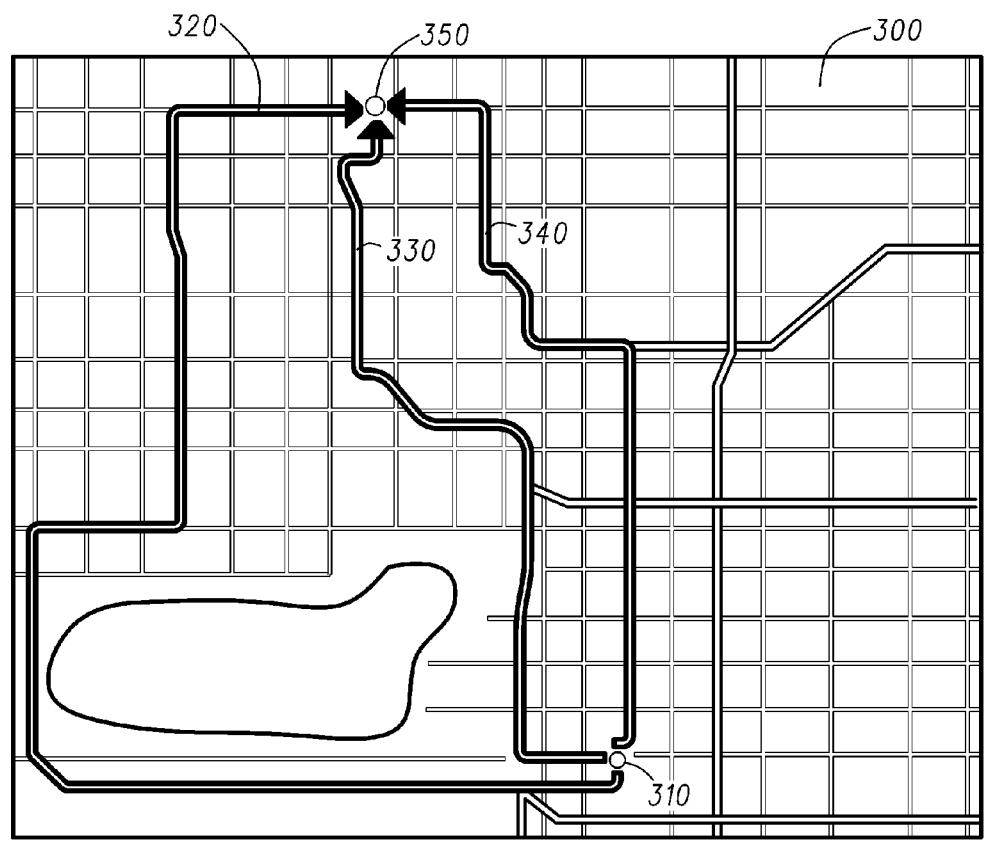
FIG. 3 is a schematic diagram illustrating potential routes evaluated by the system of FIG. 1.

In a fourth step 320, the route planning processor 102 generates at least two routes 320, 330, 340 based on the starting point 310 and the destination 350. In the example of FIG. 3, three routes are shown 320, 330, 340, although any number of routes may be calculated and evaluated by the system 100. In one exemplary embodiment, the first route 320 corresponds to the route that is optimized according to the primary route planning factor. The second and third routes 330, 340 correspond to alternate routes from the starting point 310 to the destination 350. In general, any number of prospective routes can be provided, including, for example, three to five.

Generally, the primary route planning factor may be associated with a value for each route 320, 330, 340, such as the number of miles or the number of minutes to complete a route. In one exemplary embodiment, the second and third routes 330, 340 may be generated such that the respective value related to the primary route planning factor does not deviate from the value of the first route 320 by more than predetermined amount. For example, if the primary route planning factor is distance and the first route 320 has the shortest distance between the starting point 310 and the destination 350, the second and third routes 330, 340 each have a distance of no more than 10% greater than the distance of the first route 320. Alternatively, if the primary route planning factor is driving time and the first route 320 has the shortest driving time, the second and third routes 330, 340 have a driving time of no more than 10% greater than the driving time of the first route 320. This insures that the route optimized for safety does not deviate too much from the route optimized for other, non-safety factors. Other predetermined percentages may be used, and optionally, selected by the user.

In fifth and sixth steps 325, 330, the system 100 evaluates the characteristics of the routes 320, 330, 340 based on certain safety factors. In general, the safety risk may be defined as the relative likelihood of having an accident or other safety incident on a particular route. The safety risk of driving from the starting point 310 to the destination 350 is provided by Equation (1):

$$\text{Risk} = \sum_{i}^{n} w_i x_i, \quad (1)$$

wherein $x_i$ is the risk score of the $i^{th}$ factor and $w_i$ is the weight of the $i^{th}$ factor.

More specifically, in the fifth step 325, the route planning processor 102 determines which safety factors are to be considered. The safety factors may be selected by the user or a vendor from the safety data in the safety data source 106. The route planning processor 102 may consider any number of safety factors, and a number of the safety factors may be subdivided into subfactors, some of which are listed above. Generally, the term safety factor refers to a grouping of related subfactors, although any characterization may be used. In this exemplary embodiment, the route planning processor 102 considers eight (8) safety factors, which are listed below in Table 1. Each factor is associated with at least one subfactor that enables a quantifiable risk evaluation, as discussed below.

TABLE 1

List of Factors and Subfactors

| | | |
|---|---|---|
| 1 | | Mix of Road Types and Conditions |
| | | Highway v. Local |
| 2 | | Mix of Intersection Types |
| | | Traffic Lights v. No Traffic Lights |
| 3 | | Mix of Road Users |
| | | Vehicles v. Pedestrians |
| 4 | | No. of Turns |
| | | No. of Left/Right Turns |
| | | No. of U-Turns |
| 5 | | Traffic Volumes |
| | | Total Number of Vehicles/day |
| 6 | | Neighborhood Characteristics |
| | | No. of Residential Zones |
| | | Crime Rate (Carjackings/year) |
| 7 | | Accident Characteristics |
| | | Accidents/day |
| | | Injuries in Accidents/day |
| 8 | | Ticket Information |
| | | No. of DUI Tickets/day |
| | | No. of Speeding Tickets/day |

As discussed above, each of the subfactors and factors increase or decrease the safety risk to the driver. For example, in the factor of road mix, the subfactor corresponds to the percentage of highway distance relative to local road distance. Statistically, highways are considered safer than undivided local roads, and therefore, a higher percentage of undivided local roads will be considered riskier than lower percentages. In the factor related to the mix of intersection types, the evaluated subfactor is the percentage of intersections with traffic lights, with lower percentages considered a greater risk than higher percentages. In the factor related to the mix of road users, the evaluated subfactor is the percentage of vehicles relative to pedestrians, with a higher percentage of pedestrians considered riskier. In the factor related to the number of turns, the subfactors are the number of left and right turns and the number of U-turns, with higher numbers considered riskier. In the factor of traffic volume, the subfactor of total number of vehicles is considered riskier at higher numbers. In the factor of neighborhood characteristics, the subfactors of residential zones and crime rates are considered riskier at higher numbers. Finally, in the example of Table 1, the factor of ticket information include subfactors of DUI tickets and speeding tickets, with higher numbers of such tickets considered riskier.

In the sixth step 230, the route planning processor 102 evaluates each section for each route 320, 330, 340 by associating the characteristics of the routes 320, 330, 340 with the safety factors. The route characteristics may be an average over a specified time period or may be time dependent, for example, based on the specified time that the user will be traveling along the route. One exemplary analysis of the route characteristics with respect to the safety factors is shown below in Table 2:

TABLE 2

| Route Characteristics | | | |
|---|---|---|---|
| | First Route | Second Route | Third Route |
| Mix of Road Types and Conditions | | | |
| Highway v. Local | 10% Hwy<br>90% Lcl | 20% Hwy<br>80% Lcl | 30% Hwy<br>70% Lcl |
| Mix of Intersection Types | | | |
| Traffic Lights v. No Traffic Lights | 20% Tfc Lght<br>80% No Tfc Lght | 10% Tfc Lght<br>90% No Tfc Lght | 40% Tfc Lght<br>60% No Tfc Lght |
| Mix of Road Users | | | |
| Vehicles v. Pedestrians | 100% Veh<br>0% Peds | 20% Veh<br>80% Peds | 50% Veh<br>50% Peds |
| No. of Turns | | | |
| No. of Left/Right Turns | 10 | 8 | 20 |
| No. of U-Turns | 1 | 2 | 3 |
| Traffic Volumes | | | |
| Total Number of Vehicles/day | 4000 | 3000 | 6000 |
| Neighborhood Characteristics | | | |
| No. of Residential Zones | 1 | 0 | 3 |
| Crime Rate (Carjackings/year) | 10 CJ | 15 CJ | 20 CJ |
| Accident Characteristics | | | |
| Accidents/day | 2 per day | 1 per day | 5 per day |
| Injuries in Accidents/day | 3 per day | 1 per day | 10 per day |
| Ticket Information | | | |
| No. of DUI Tickets/day | 3 per day | 4 per day | 5 per day |
| No. of Speeding Tickets/day | 4 per day | 3 per day | 1 per day |

In a further step 235, the route planning processor 102 assigns a risk score for each safety factor or subfactor within each route 320, 330, 340 based on data from the safety data source 106. In such an embodiment, the safety data source 106 may include the risk scores or algorithms for calculating the risk scores based on the route characteristics. The risk score provides a normalized quantity such that the route planning processor 102 can evaluate the relative safety of each route. In the examples discussed herein, a higher score corresponds to a more risky activity. Like the route characteristics, the risk scores may be general or be time dependent, for example, based on the specified time that the user will be traveling along the route. An exemplary list of the risk scores for each factor and subfactor is provided below in Table 3:

TABLE 3

| Factor Risk Scores | | | |
|---|---|---|---|
| | First Route | Second Route | Third Route |
| Mix of Road Types and Conditions | | | |
| Subfactor: Hwy v. Lcl | 20 | 10 | 40 |
| Avg Factor Score | 20 | 10 | 40 |
| Mix of Intersection Types | | | |
| Subfactor: Tfc Lghts v. No Tfc Lghts | 0 | 20 | 50 |
| Avg Factor Score | 0 | 20 | 50 |
| Mix of Road Users | | | |
| Subfactors: Veh v. Peds | 20 | 20 | 40 |
| Avg Factor Score | 20 | 20 | 40 |
| No. of Turns | | | |
| Subfactor: No. of Left/Right Turns | 50 | 20 | 60 |
| Subfactor: No. of U-Turns | 30 | 40 | 60 |
| Avg Factor Score | 40 | 30 | 60 |

TABLE 3-continued

| Factor Risk Scores | | | |
|---|---|---|---|
| | First Route | Second Route | Third Route |
| Traffic Volumes | | | |
| Subfactor: No. of Veh | 40 | 30 | 60 |
| Avg Factor Score | 40 | 30 | 60 |
| Neighborhood Characteristics | | | |
| Subfactor: No. of Residential Zones | 10 | 0 | 30 |
| Subfactor: Crime Rate | 10 | 20 | 30 |
| Avg Factor Score | 10 | 10 | 30 |
| Accident Characteristics | | | |
| Subfactor: No. of Accidents | 30 | 5 | 40 |
| Subfactor: No. of Injuries | 20 | 5 | 40 |
| Avg Factor Score | 25 | 5 | 40 |
| Ticket Information | | | |
| Subfactor: No. of DUI Tickets | 15 | 30 | 35 |
| Subfactor: No. of Speeding Tickets | 25 | 10 | 5 |
| Avg Factor Score | 10 | 20 | 20 |

The risk scores may be calculated in a number of ways, and Table 3 illustrates just one exemplary embodiment. As an example, the risk score may have an absolute scale. For example, the factor of mix of road types and conditions is based on the percentage of highway distance. This risk score corresponds directly to the percentage of highway distance, i.e., x % of highway corresponds to a score of x. For example, first route is 20% highway, which corresponds to a risk score of 20. Of course, other subfactor scoring scales or scoring mechanisms may be used. For example, in another embodiment, the subfactor scoring scale may be relative. In such an embodiment, the route with the highest percentage of highway would be assigned a score of 100, the next highest percentage would be assigned a score of 50, and the least percentage would be assigned a score of 0. As one example of this, with respect to subfactor associated with the number of U-turns, the third route 340 has the highest number of U-turns, followed by the first route 320 and the second route 330. In this scoring example, the highest number of U-turns is assigned a score of 60, the next highest is assigned a score of 40, and the least number is assigned a score of 20. In other words, the differences between relative scores are not necessarily proportional to the difference between relative quantitative data. Generally, any suitable scoring scheme may be provided.

The average risk score for the respective factor is determined by averaging the respective subfactor scores. In other embodiments, the factor risk score can be a weighted average of the subfactor risk scores to accommodate the relative importance of each subfactor.

In a next step 240, the route planning processor 102 determines the weight (w, in Equation (1) above) of each risk factor. Continuing the example of above, one set of exemplary weights for each factor is provided below in Table 4.

TABLE 4

Factor Weights

| Factor | Weight (%) |
|---|---|
| Mix of Road Types and Conditions | 10 |
| Mix of Intersections Types | 10 |
| Mix of Road Users | 15 |
| Number of Turns | 5 |
| Traffic Volumes | 20 |
| Number of Neighborhoods | 10 |
| Frequency of Accidents | 20 |
| Number and type of traffic tickets | 10 |

Generally, the weight reflects how a factor (or subfactor) contributes to an accident relative to the other factors. For example, using the example above, traffic volume accounts for 20% weight and number of turns accounts for 5% weight of overall risk calculation. As such, traffic volume is weighted four times as much as number of turns in the overall score assessment, such as, for example, if the weights are based on statistics that indicate that traffic volume is four times as likely to cause an accident than number of turns or if a user is subjectively more concerned about safety in traffic rather than number of turns. The weight may be derived from statistical data and predetermined by the system 100. In one exemplary embodiment, the weight may be modeled by the number of accidents and accident severity for each factor or subfactor. In another embodiment, the relative weights may be selected or assigned by the user.

In example above, the risk score is considered to be a risk score within the factor or subfactor, and the weight is considered to weigh the relative factors to account for different risk contributions. In other embodiments, the factor or subfactor may be scored with respect to an overall risk contribution to a potential accident. For example, each intersection increases a driver's risk for an accident by specific percentage. In such a scheme, the weight would not be necessary and the factor or subfactor scores could be simply summed to reach an overall risk score.

In a further step 245, the route planning processor 102 multiples the respective weights and risk scores and sums the results to arrive at a final route score, as stated above in Equation (1). Table 5, below, indicates the results for the three routes 320, 330, 340:

TABLE 5

Weighted Risk Scores

| | Factors | First Route | Second Route | Third Route |
|---|---|---|---|---|
| 1 | Mix of Road Types and Conditions | 1 | 2 | 3 |
| 2 | Mix of Intersection Types | 2 | 1 | 4 |
| 3 | Mix of Road Users | 0 | 3 | 7.5 |
| 4 | No. of Turns | 1 | 1 | 2 |
| 5 | Traffic Volumes | 8 | 6 | 12 |
| 6 | Neighborhood Characteristics | 1 | 1 | 3 |
| 7 | Accident Characteristics | 5 | 1 | 8 |
| 8 | Ticket Information | 1 | 2 | 2 |
| | Final Route Scores | 19 | 17 | 41.5 |

Accordingly, based on the final route score, the third route 240 is the safest of the three routes because it has the lowest risk score. In a final step 250, the route planning processor 102 generates driving directions and other data associated with the second route 330 for the user, as will now be described.

Figure 4:
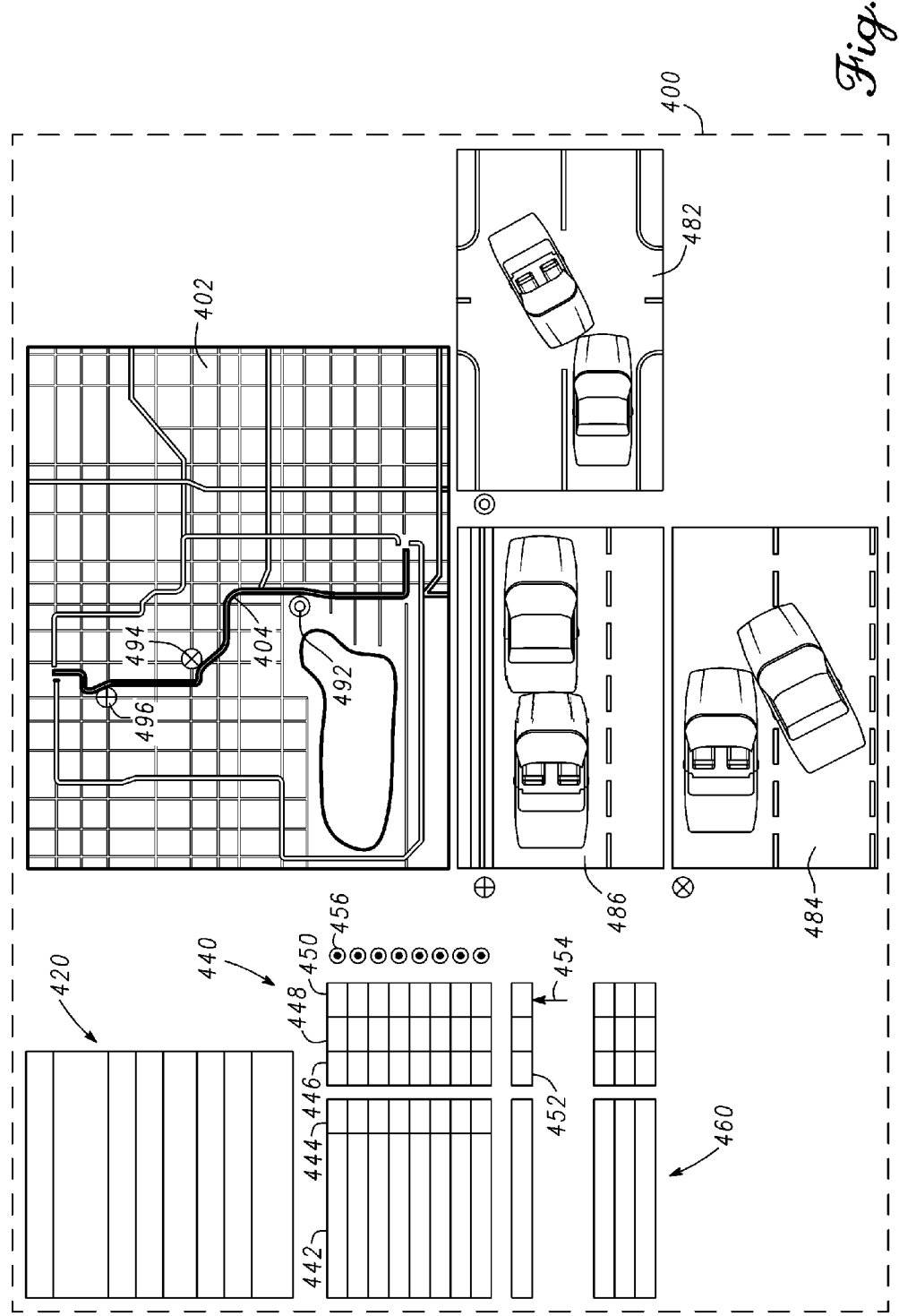
FIG. 4 is an exemplary representation of a display produced by the system of FIG. 1.

FIG. 4 is an exemplary display 400 generated by the route planning processor 102, for example, for display on the display device 110 of FIG. 1. The display 400 generally a map image 402 depicting the route 404 (i.e., the second route 330 of FIG. 3) from the starting point to the destination. The map image 402 is a visual representation of the actual area through which the route 404 passes. The display 400 further includes step-by-step driving instructions 420 associated with the route 404, which may include a list of directions, the mileage associated with each section of route 404, and the driving time associated with each section of the route 404. The display 400 may further include information 440 related to the risk assessment. For example, the risk assessment information 440 may include a list of the factors 442, as well as the associated weight 444 and weighted risk scores 446, 448, 450 for each of the potential routes. The assessment information 440 may further include the final route score 452, an indication 454 of the selected route, and a display 460 of the driving time, driving distance, and average gas mileage for each of the routes. In one exemplary embodiment, the display 400 may also have interactive elements, such as elements 456 that enable the user to select or deselect safety factors. For example, if the user is unconcerned about the mix of road types, the user may deselect this factor by clicking the associated interactive element 456. In response, the route planning processor 102 will recalculate the risk scores of the three routes as described above, but without consideration of the deselected factor. Other interactive elements may be provided, such as those that enable the user to change the weights of the safety factors and to add safety factors.

The display 400 may further display data related to accident prone areas 492, 494, 496 along the route 404, which correspond to the areas along the route 404 that are determined to be the riskiest. In the display 400, the accident prone areas 492, 494, 496 are represented by a coded circle and function as a warning to the user to further mitigate the risk of the route 404. In some embodiments, the display further displays the possible accident scenarios 482, 484, 486 associated with each area 492, 494, 496. For example, scenario 482 indicates that the area 492 is associated with collisions between a left turn and oncoming traffic. Scenario 484 indicates that the area 494 is prone to accidents related to improper lane changes. Scenario 486 indicates that the area 496 is prone to accidents with wrong-way drivers. The scenarios 482, 484, 486 enable further warnings and suggestions to the driver such that specific risks may be reduced or eliminated.

FIG. 5 is a schematic representation of an alternate exemplary embodiment of a route planning system 500. Although the route planning system 500 generally operates as the route planning system 100 discussed above, at least some components of the route planning system 500 are incorporated into a vehicle 502 and/or a general computing device 552 that communicate with a data center 554 via a network 556. Although the data center 554 is illustrated in FIG. 5 as being remote from the vehicle 502, the data center 554 may additionally be onboard the vehicle 502. The vehicle 502, computing device 552, data center 554, and network 556 will initially be described, followed by a description of the operation of the route planning system 500.

The vehicle 502 may be any type of vehicle, including automobiles, trucks, recreational vehicles, motorcycles, aircraft and water craft. In one exemplary embodiment, the vehicle 502 includes a vehicle module 504 that includes a global positioning system (GPS) component 506, a user interface 508, a vehicle communication system 510, a display device 512, an audio device 514, and vehicle storage 516, each coupled to a vehicle processor 518. The vehicle processor 518 may be any type of computer, microprocessor or controller and perform at least some of the functions described above in reference to the route planning processor 102 of FIG. 1. The vehicle module 504 may be, for example, a vehicle navigation device or system.

The GPS component 506 may generally correspond to the location data source 104 discussed above in FIG. 1 and is capable of interacting with GPS satellites to determine the current location of vehicle 502. In alternate embodiments, the GPS component 506 may be omitted and the vehicle module 504 may utilize positioning data provided by a cellular telecommunication network or any appropriate locating system, or the vehicle module 504 may rely on the user to enter the current location or desired starting point.

The user interface 508 may generally correspond to the user interface 108 discussed above in FIG. 1. The user interface 508 is configured to allow the driver of the vehicle 502 to initiate route requests via buttons, controls, or microphones. For example, the user interface 508 may be a touchscreen with user-interface elements, such as drop down lists, check boxes, radio buttons, text input fields, or the like implemented using a variety of programming languages or programming methods.

The vehicle communication system 510 is configured to communicate with a data center 554. Such communications may include the transmission of vehicle data, route request signals from the vehicle, and the receipt of response signals from the data center 554 corresponding to the recommended route. In one exemplary embodiment, the vehicle communication system 510 includes a telematics or cellular telecommunications system. In other examples, communication devices other than cellular telecommunications may be employed. For example, and without limitation, an RF transceiver, a WiFi communications device, a satellite communications device, a dedicated short range communications device, or any other type of communications device effective to communicate with data center 554 may be employed.

The display device 512 generally corresponds to the display device 110 of FIG. 1 and may, for example, be any suitable display device for providing a visual display of the proposed route. The display device 512 may, for example, display the visual components illustrated in FIG. 4. The audio device 514 generally corresponds to the audio device 112 of FIG. 1 and may, for example, be any suitable audio device for providing audible route instructions to the driver of the vehicle 502.

The vehicle module 504 may further include vehicle storage 516 configured to store instructions for the vehicle processor 518 as well as any route or vehicle data for access by the other module components. The vehicle storage 516 may store the safety and mapping data described herein, although generally, such data is accessed from the data center 554 as described below. The vehicle storage 516 can be implemented with any type of hardware, such as a magnetic disk, an optical disk, a semiconductor memory, or any other recording medium.

The data center 554, in general, may be any collocated or separately located databases that are accessible to the computing device 552 and the vehicle module 504 via the network 556. For example, the data center 554 may include the safety data source 106 and at least some of the processing function of the route planning processor 102 discussed above in FIG. 1. For example, the data center 554 may be configured to receive a route guidance request from the vehicle 502 or the computing device 552 and generate a suitable route, as discussed below. As such, the data center 554 may include any number of processors, switches, servers, databases, and live advisors, as well as a variety of other telecommunication and computer equipment. The data center 554 may be a call center, for example.

The network 556 may include any hardware, software, and firmware necessary to convey content between the vehicle module 504 and the computing device 552. Such content may be contained within analog or digital signals and conveyed through data or voice channels. The network 556 may also include network equipment, such as routers, data lines, hubs, and intermediary servers which together form a packet-based network, such as the Internet or an intranet. The network 556 may further include circuit-based communication components and mobile communication components, such as telephony switches, modems, cellular communication towers, and the like.

As examples, the network 556 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 556 may include a single local area network (LAN) or wide-area network (WAN), or combinations of LANs or WANs, such as the Internet. The various devices coupled to the network 556 may incorporate wireless connections, including short-range (e.g., inductive telemetry or Bluetooth) or longer-range (e.g., IEEE 802.11, IEEE 802.x wireless communication, 3G, 4G, or cellular wireless) protocols.

The computing device 552 may be any general purpose computing device. For example, the computing device 5524 may be a laptop computer, desktop computer, smartphone, handheld navigation systems, or the like.

During a first exemplary operation, the vehicle module 504 may generate a route request. For example, the user may provide the desired destination to the vehicle processor 518 via the user interface 508. The vehicle processor 518 additionally receives the current (or starting) location from the GPS component 506 and suitably packages the current location and destination such that the communication system 510 sends the route request to the data center 554 via the network

556. The route request may further include information such as primary route characteristics and/or safety risk factor preferences of the user. As described above, the data center 554 receives the route request, generates a number of possible routes, evaluates the routes based on one or more safety factors, and provides the suggested route to the vehicle module 504 via the network 556. The vehicle processor 518 receives the suggested route and generates display and audio signals to convey the suggested route to the user via the display device 512 and audio device 514. The information provided to the user may include the information discussed above in FIG. 4.

During a second exemplary operation, the user enters a starting and final location into the computing device 552 to generate a route request. The computing device 552 then sends the route request to the data center 554 via the network 556. The data center 554 receives the route request, generates a number of possible routes, evaluates the routes based on one or more safety factors, and provides the suggested route to the computing device 552 via the network 556. The computing device 552 receives the suggested route and generates display and/or audio signals to convey the suggested route to the user via any suitable visual and audio components. In this exemplary operation, the computing device 552 may include a printer such that the suggested route may be printed for later navigation.

Accordingly, the exemplary embodiments described above provide improved systems and methods that plan routes based on safety considerations. Exemplary embodiments have been described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, exemplary embodiments may be practiced in conjunction with any number of practical vehicle navigation system platforms, architectures, and deployments.

While at least one exemplary example has been presented in the foregoing detailed description, it should be appreciated that a vast number of variations exist. It should also be appreciated that the exemplary example or exemplary examples are only examples, and are not intended to limit the scope, applicability, or configuration in any way. Rather, the foregoing detailed description will provide those skilled in the art with a convenient road map for implementing the exemplary example or exemplary examples. It should be understood that various changes can be made in the function and arrangement of elements without departing from the scope as set forth in the appended claims and the legal equivalents thereof.

What is claimed is:

1. A method for planning a route for a vehicle from a starting point to a destination, the method comprising the steps of:
   generating, with a processor, a plurality of routes based on a non-safety factor such that each route does not deviate from the other routes in the plurality of routes by more than a predetermined amount;
   evaluating, with the processor the plurality of routes based on a safety factor;
   selecting, with the processor, a first route from the plurality of routes based on the safety factor;
   generating, with the processor, driving instructions based on the first route; and
   displaying the first route on a display device.

2. The method of claim 1, further comprising the step of receiving the non-safety factor from a user.

3. The method of claim 1, further comprising the step of receiving the safety factor from a user.

4. The method of claim 1, further comprising the step of retrieving data related to the safety factor for each of the plurality of routes.

5. The method of claim 1, further comprising the step of receiving a user input associated with the starting point and the destination.

6. The method of claim 1, further comprising the step of providing audio of the driving instructions.

7. The method of claim 1, wherein the non-safety factor is driving distance and wherein the plurality of routes includes a second route at the shortest distance among the plurality of routes, and wherein the generating step includes generating the plurality of routes such that the first route has a distance that is no greater than a predetermined percentage more than the shortest distance.

8. The method of claim 1, wherein the non-safety factor is driving time and wherein the plurality of routes includes a second route with the shortest driving time among the plurality of routes, and wherein the generating step includes generating the plurality of routes such that the first route has a driving time that is no greater than a predetermined percentage more than the shortest driving time.

9. The method of claim 1, further comprising the step of generating a safety warning associated with at least one section of the first route.

10. The method of claim 9, wherein the safety warning includes a potential accident scenario.

11. The method of claim 1, wherein the evaluating step includes evaluating a plurality of safety factors.

12. The method of claim 11, wherein the evaluating step further includes
    determining route characteristics for each of the plurality of routes based on the plurality of safety factors; and
    assigning risk scores to the route characteristics for each of the plurality of routes.

13. The method of claim 12, wherein the evaluating step further includes
    weighing and normalizing the risk scores to provide a final risk score for each of the plurality of routes.

14. A system for planning a route from a starting point to a destination, comprising:
    a non-safety data source configured to store non-safety data;
    a safety data source configured to store safety data;
    a processor and memory coupled to the non-safety and safety data sources, the memory comprising computer-executable instructions that, when executed by the processor, cause the system to:
        generate a plurality of routes based on the non-safety data such that each route does not deviate from the other routes in the plurality of routes by more than a predetermined amount,
        evaluate the plurality of routes based on the safety data,
        select a first route from the plurality of routes based on the safety data, and
        generate driving instructions based on the first route; and
    a display device coupled to the processor and configured to receive the driving instructions and to generate a user display based on the driving instructions.

15. The system of claim 14, wherein the processor is configured to generate a safety warning for display on the display device associated with at least one section of the first route.

16. The system of claim 15, further comprising an audio device coupled to the processor, and wherein the processor is configured to generate advice information or warning information based on the driving instructions for output on at least one of the display device or audio device.

17. The system of claim 15, wherein the safety warning includes a potential accident scenario.

18. A system for planning a route from a starting point to a destination, comprising:
- a user interface configured to receive an indication of the destination from a user;
- a current location data source configured to determine the starting point;
- a non-safety data source configured to store non-safety data;
- a safety data source configured to store safety data;
- a processor and memory coupled to the user interface, the current location data source, the non-safety data source and the safety data source, the memory comprising computer-executable instructions that, when executed by the processor, cause the system to
  - generate a plurality of routes from the starting point to the destination based on the non-safety data such that each route does not deviate from the other routes in the plurality of routes by more than a predetermined amount,
  - evaluate the plurality of routes based on the safety data,
  - select a first route from the plurality of routes based on the safety data, and
  - generate driving instructions based on the first route; and
- a display device coupled to the processor and configured to receive the driving instructions and to generate a user display based on the driving instructions.

* * * * *